United States Patent Office 3,402,174
Patented Sept. 17, 1968

3,402,174
AMINOALKYL PYRROL-3-YL KETONES AND
3-HALOALKANOYL PYRROLES
Irwin J. Pachter, Woodbury, N.Y., assignor to Endo
Laboratories, Inc., Garden City, N.Y., a corporation of New York
No Drawing. Filed Aug. 27, 1965, Ser. No. 483,336
13 Claims. (Cl. 260—247.5)

ABSTRACT OF THE DISCLOSURE

Novel aminoalkyl pyrrol-3-yl ketones which are unsubstituted in the 4-position of the pyrrole ring are prepared by reacting the appropriate haloacylhalides with Grignard derivatives of the appropriate pyrroles.

The compounds are useful as tranquilizers, anti-depressants, analgesics and hypotensives.

This invention relates to novel aminoalkyl pyrrol-3-yl ketones and their acid addition salts having valuable pharmacodynamic activity. It relates as well to processes for the preparation of these compounds; and also to novel haloacyl intermediates unsubstituted in the 4-position of the pyrrole ring. The aminoalkyl products of this invention have central nervous system activity and, in particular, are useful as tranquilizers, anti-depressants, analgesics and hypotensives.

The novel aminoalkyl compounds of this invention are represented by the structural Formula A in which $R_1$ is hydrogen or a lower alkyl group of not more than four carbon atoms or benzyl.

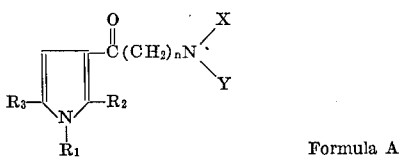

Formula A $R_2$ and $R_3$ are lower alkyl groups of not more than four carbon atoms or phenyl.

$n$ is 1, 2 or 3.

X and Y are hydrogen, lower alkyl, hydroxy-lower alkyl, lower acyloxyalkyl, carbamyloxy-lower alkyl, phenyl-lower alkyl, or when taken together, X and Y may be connected to form a heterocyclic ring of not more than eight members such as piperidino, (lower alkyl)piperidino, di(lower alkyl) piperidino, (lower alkoxy)piperidino, hydroxypiperidino, (lower acyloxy)piperidino, pyrrolidino, (lower alkyl)pyrrolidino, (lower alkoxy)pyrrolidino, hydroxypyrrolidino, morpholino, (lower alkyl)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino, (lower alkoxy)piperazino, phenylpiperazino, chlorophenylpiperazino, tolylpiperazino, anisylpiperazino, hydroxyalkylpiperazino, lower acyloxy-lower alkylpiperazino and carbamyloxy-lower alkyl piperazino. The terms "lower acyl," "lower alkyl" and "lower alkoxy" refer to both straight and branched chain radicals of no more than five carbon atoms.

Acids useful for preparing the acid addition salts include inorganic acids, such as hydrochloric, hydrobromic, sulfuric, nitric, phosphoric and perchloric as well as organic acids such as oxalic, tartaric, citric, acetic, succinic, maleic and ethanedisulfonic.

The novel aminoalkyl products of this invention are derived from novel haloacyl intermediates unsubstituted in the 4-position of the pyrrole ring.

Most of the haloacyl intermediates are prepared by reaction of haloacyl halides with Grignard derivatives of appropriate pyrroles.

An alternate route to many of the intermediates involves reaction of a haloalkyl nitrile with a pyrrole in the presence of hydrogen chloride.

The Grignard reaction is a selective process when an unsymmetrical pyrrole is used. In the primary product, the acyl group is situated in the less hindered position.

On the other hand, the use of the hydrogen chloride-haloalkyl nitrile process in the case of an unsymmetrical pyrrole leads to a mixture which must be separated by fractional crystallization and in which the more hindered product may actually predominate.

In the final step of the synthesis, an organic base

wherein X and Y have the significance above set forth is permitted to stand at room temperature with the haloacyl intermediate for from two to twenty-four hours. Alternatively, the reactants may be heated in a suitable solvent such as a lower alcohol for ten minutes to four hours in order to complete the reaction.

It is particularly advantageous to employ lower temperatures when 3-halopropyl pyrrol-3-yl ketones undergo reaction. Heating causes many of these compounds to produce cyclic by-products.

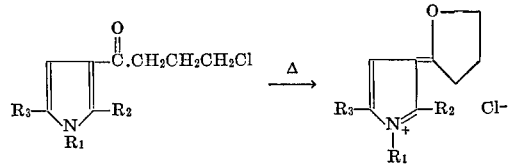

Exemplary of a process for the preparation of compounds of Formula A is the following sequence

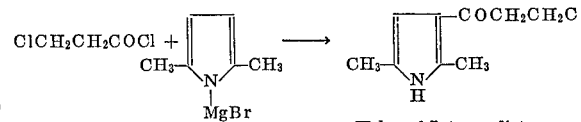

Haloacyl Intermediate

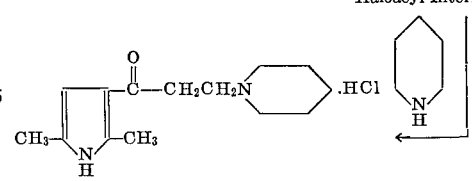

For therapeutic use, the aminoalkyl compounds of this invention may be formulated with conventional pharmaceutical carriers to form tablets, capsules, elixirs, solutions, suspensions, suppositories and the like.

The foregoing descriptions and the following examples are exemplary of the scope and procedures of this invention. Other obvious equivalents to the structures detailed herein will be apparent to one skilled in the art and are, accordingly, included in this invention. Weights and measurements are stated in Metric System values.

EXAMPLE 1

Chloromethyl 2,5-dimethylpyrrol-3-yl ketone

A mixture of 33 g. of 2,5-dimethylpyrrole, 35 g. of chloracetonitrile and 200 ml. of anhydrous ether was cooled in ice and saturated with hydrogen chloride. After 16 hours the supernatant solution was decanted and the residue was heated with water on a steam bath and cooled. The product was collected and recrystallized from aqueous methanol; M.P 151–152°.

EXAMPLE 2

2,5-dimethylpyrrol-3-yl ketone 4-phenylpiperazinomethyl

A solution of 2.1 g. of chloromethyl 2,5-dimethylpyrrol-3-yl ketone and 2.8 g. of 1-phenylpiperazine in methanol was heated under reflux for 2 hours. Evaporation and treatment with aqueous ammonia provided the product, M.P. 138–139° after recrystallization from benzene-cyclohexane.

EXAMPLE 3

Chloromethyl 2-methyl-5-phenylpyrrol-3-yl ketone and chloromethyl 5-methyl-2-phenylpyrrol-3-yl ketone A solution of 50 g. of 2-methyl-5-phenylpyrrole and 100 g. of chloracetonitrile in absolute ether was cooled in ice and saturated with hydrogen chloride. After standing at room temperature for 48 hours the ethereal layer was decanted and the residue was heated with water on a steam bath to decompose the imine hydrochlorides. Fractional crystallization from methanol and benzene produced chloromethyl 2-methyl-5-phenylpyrrol-3-yl ketone, M.P. 183° and chloromethyl 5-methyl - 2 - phenylpyrrol-3-yl ketone, M.P. 116°. Structures were determined by ultraviolet spectral comparison with known compounds.

EXAMPLE 4

2-methyl-5-phenylpyrrol-3-yl 4-phenylpiperazinomethyl ketone

A solution of 5 g. of chloromethyl 2-methyl-5-phenylpyrrole-3-yl ketone and 9 g. of 1-phenylpiperazine in 70 ml. of methanol was heated under reflux for 2 hours. The solvent was removed and the base, M.P. 123.5–124°, was purified by recrystallization from aqueous methanol.

EXAMPLE 5

5-methyl-2-phenylpyrrol-3-yl morpholinomethyl ketone

A solution of 5 g. of chloromethyl 5-methyl-2-phenylpyrrol-3-yl ketone in 50 ml. of morpholine was allowed to stand at room temperature for 24 hours. Excess morpholine was removed and the product was precipitated by addition of water. It was purified by recrystallization from benzene.

EXAMPLE 6

2-chloroethyl 2,5-dimethylpyrrol-3-yl ketone

To a Grignard solution prepared from 28.0 g. of magnesium, 120.0 g. of ethyl bromide and 280 ml. of ether was added 95.1 g. of 2,5-dimethylpyrrole. A precipitate formed. To the resulting slurry was added 146 g. of 3-chloropropionyl chloride. One hour after the addition was completed, the reaction mixture was treated with water and then extracted with ether. The ethereal solution was washed with aqueous sodium bicarbonate, dried and concentrated to yield the product, M.P. 99.5–100.5°.

In the same manner, 2,5-diethylpyrrole produces 2-chloroethyl 2,5-diethylpyrrol-3-yl ketone.

EXAMPLE 7

2,5-dimethylpyrrol-3-yl 2-piperidinoethyl ketone

A 7.7 g. sample of 2-chloroethyl 2,5-dimethylpyrrol-3-yl ketone was allowed to stand with 50 ml. of piperidine at room temperature for 24 hours. Piperidine hydrochloride was removed by filtration and the filtrate was evaporated to dryness. The residual solid was recrystallized from aqueous methanol and from benzene-cyclohexane; M.P. 135–136°.

In the same manner, 2-chloroethyl 2,5-diethylpyrrol-3-yl ketone produces 2,5-diethylpyrrol-3-yl 2-piperidinoethyl ketone.

EXAMPLE 8

2,5-dimethylpyrrol-3-yl 2-morpholinoethyl ketone

By the method of Example 7, using morpholine in place of piperidine, the morpholino derivative was obtained; M.P. 145.5°–146.5°.

EXAMPLE 9

2-dimethylaminoethyl 2,5-dimethylpyrrol 3-yl ketone

By the method of Example 7, using ethanolic dimethylamine in place of piperidine, the dimethylamino derivative was obtained. The hydrochloride salt melted at 181–182°.

EXAMPLE 10

2,5-dimethylpyrrol-3-yl 2-(4-phenylpiperazino) ethyl ketone

A solution of 3.0 g. of 2-chloroethyl 2,5-dimethylpyrrol-3-yl ketone and 5.5 g. of 1-phenylpiperazine in 75 ml. of methanol was heated under reflux for 10 minutes and evaporated to dryness. The residue was treated with water and alkali and the crystalline product was collected. Upon recrystallization from aqueous methanol, it melted at 159–160°.

EXAMPLE 11

2-[4-(oanisyl)piperazino] ethyl 2,5-dimethylpyrrol-3-yl ketone

By the method of Example 10 using 1-(o-anisyl)piperazine in place of 1-phenylpiperazine, there was obtained a dimorphic product. The lower melting form melted at 136–137.5°. The higher melting form melted at 148–149°. The crystalline forms were interconvertible.

EXAMPLE 12

2,5-dimethylpyrrol-3-yl 2-[4-(o-tolyl)piperazino] ethyl ketone

A solution of 9.3 g. of 2-chloroethyl 2,5-dimethylpyrrol-3-yl ketone and 17.6 g. of 1-(o-tolyl)piperazine in 200 ml. of ethanol was heated under reflux for 1 hour and then evaporated to dryness. The residue was mixed with 3 N hydrochloric acid and the insoluble hydrochloride salt of the product was collected. The salt was suspended in water and the free base liberated with sodium hydroxide. The base was crystallized from aqueous methanol and melted at 141.5–143°.

EXAMPLE 13

3-chloropropyl 2,5-dimethylpyrrol-3-yl ketone

A Grignard solution was prepared from 21 g. of magnesium, 90 g. of ethyl bromide and 500 ml. of ether. A 95 g. sample of 2,5-dimethylpyrrole in 200 ml. of ether was added followed by a solution of 122 g. of 4-chlorobutyryl chloride in 400 ml. of ether. A yellow precipitate formed. After 2 hours of stirring, the reaction was quenched by addition of ammonium chloride solution. The ethereal layer was separated, washed with sodium bicarbonate solution and dried. The product, which separated upon concentration, was recrystallized from aqueous methanol and melted at 91–92°.

EXAMPLE 14

2,5-dimethylpyrrol-3-yl 3-piperidinopropyl ketone

A solution of 8 g. of 3-chloropropyl 2,5-dimethylpyrrol-3-yl ketone in 50 ml. of piperidine was allowed to stand for 16 hours at room temperature whereupon crystals of piperidine hydrochloride separated. The mixture was diluted with ether and filtered. The filtrate was evaporated to dryness and the crystalline residue was purified by recrystallization from ethyl acetate; M.P. 96–97.5°.

EXAMPLE 15

2,5-dimethylpyrrol-3-yl 3-morpholinopropyl ketone hydrochloride

This compound was prepared by the method of Example 14 using morpholine in place of piperidine. The product was purified as the hydrochloride salt, M.P. 202–204°, from isopropanol-acetone.

In similar fashion, ethanolic dimethylamine produced 3-dimethylaminopropyl 2,5-dimethylpyrrol-3-yl ketone, and 1-phenylpiperazine produced 2,5-dimethylpyrrol-3-yl 3-(4-phenylpiperazino)-propyl ketone.

EXAMPLE 16

3-chloropropyl 1,2-dimethyl-5-phenylpyrrol-3-yl ketone 1,2-dimethyl-5-phenylpyrrole, M.P. 55°, was prepared by heating 1-phenylpentane-1,4-dione with alcoholic methylamine. It was subjected to the Grignard reaction as described in Example 13 to produce the desired product, M.P. 97–97.5° from hexane.

EXAMPLE 17

1,2-dimethyl-5-phenylpyrrol-3-yl 3-piperidinopropyl ketone

By the method of Example 14 using the 3-chloropropyl derivative of Example 16, the desired product was obtained.

The active aminoalkyl compounds of this invention may be administered in the form of tablets or capsules in doses of 10–200 mg., in syrup at 2–20 mg./ml. concentration, in 10–200 mg. suppositories or by parenteral injection in 10–50 mg./ml. concentration.

The following examples are illustrative.

EXAMPLE 18

| Ingredients: | Mg./Ml. |
|---|---|
| 2,5-dimethylpyrrol-3-yl 3-morpholinopropyl ketone hydrochloride | 50 |
| Sodium chloride, q.s. for isotonicity. | |
| Methylparaben U.S.P. | 1.8 |
| Propylparaben U.S.P. | 0.2 |
| Water, q.s. | |

The above ingredients are combined in sterile solution for parenteral use.

EXAMPLE 19

| Ingredients: | Mg./Ml. |
|---|---|
| 2,5-dimethylpyrrol-3-yl 2-piperidinoethyl ketone | 25 |
| Lactose | 100 |
| Magnesium stearate | 1 |
| Cab-O-Sil (amorphous silicon dioxide) | 5 |

These ingredients were combined, blended and passed through a No. 1 screen of Fitzpatrick comminutor machine before encapsulating into a two-piece hard gelatin No. 3 capsule on a standard capsulating machine at a net weight of 126 mg.

EXAMPLE 20

| Ingredients: | Grams/liter |
|---|---|
| 2,5-dimethylpyrrol-3-yl 2-(4-phenylpiperazino)-ethyl ketone tartrate | 10 |
| Granulated sugar | 600 |
| Flavor, q.s. | |
| Color, q.s. | |
| Sodium benzoate | 1 |
| Deionized water, q.s. | |

All above ingredients are dissolved in water, combined and made up to a volume of one liter.

It will be understood that the foregoing description of the invention and the examples set forth are merely illustrative of the principles thereof. Accordingly, the appended claims are to be construed as defining the invention within the full spirit and scope thereof.

I claim:

1. A compound selected from the group consisting of (1) compounds of following Formula I and the pharmaceutically acceptable acid addition salts thereof

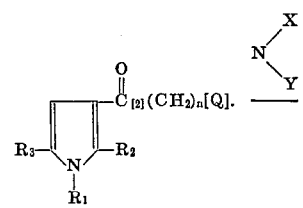

$R_1$ is hydrogen or lower alkyl of not more than four carbon atoms or benzyl, $R_2$ and $R_3$ are lower alkyl of not more than four carbon atoms, or phenyl, $n$ is 1, 2 or 3.

X and Y are hydrogen, lower alkyl, hydroxy-lower alkyl, lower alkanoyloxy lower alkyl, carbamyloxy-lower alkyl, phenyl-lower alkyl, or when taken together, X and Y form a moiety selected from the group consisting of piperidino, (lower alkyl)piperidino, di(lower alkyl)piperidino, (lower alkoxy)piperidino, hydroxypiperidino, (lower alkanoyloxy)piperidino, pyrrolidino, (lower alkyl)pyrrolidino, (lower alkoxy)pyrrolidino, hydroxypyrrolidino, morpholino, (lower alkyl)morpholino, thiamorpholino, (lower alkyl)thiamorpholino, di(lower alkyl)thiamorpholino, (lower alkoxy)thiamorpholino, piperazino, (lower alkyl)-piperazino, di(lower alkyl)piperazino, C-(lower alkoxy) piperazino, di(lower alkyl)piperazino, (lower alkoxy)piperazino, phenylpiperazino, chlorophenylpiperazino, tolylpiperazino, anisylpiperazino, hydroxy-lower alkylpiperazino, lower alkanoyloxy-lower alkylpiperazino and carbamyloxy-lower alkyl piperazino, wherein "lower alkanoyl," "lower alkyl" and "lower alkoxy" have straight and branched chains of no more than five carbon atoms.

2. An ω-di(lower alkyl)aminolower alkyl 2,5-di(lower alkyl)pyrrol-3-yl ketone.

3. 2,5-dimethylpyrrol-3-yl 4-phenylpiperazinomethyl ketone.

4. 2-dimethylaminoethyl 2,5-dimethylpyrrol-3-yl ketone.

5. 2,5-dimethylpyrrol-3-yl 2-morpholinoethyl ketone.

6. 2,5-dimethylpyrrol-3-yl 2-piperidinoethyl ketone.

7. 2,5-dimethylpyrrol-3-yl 2-(4-phenylpiperazino)ethyl ketone.

8. 3-dimethylaminopropyl 2,5-dimethylpyrrol-3-yl ketone.

9. 2,5-dimethylpyrrol-3-yl 3-morpholinopropyl ketone.

10. 2,5-dimethylpyrrol-3-yl 3-piperidinopropyl ketone.

11. 2,5-dimethylpyrrol-3-yl 3-(4-phenylpiperazino)-propyl ketone.

12. An ω-(heterocycloamino) lower alkyl 2,5-di(lower alkyl) pyrrol-3-yl ketone of claim 1, wherein "heterocycloamino" is the group

of claim 1.

13. A compound having the formula

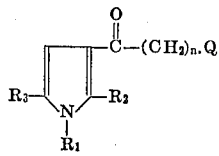

wherein:

$R_1$ is hydrogen, lower alkyl of not more than 4 carbon atoms, or benzyl, $R_2$ and $R_3$ are lower alkyl groups of not more than 4 carbon atoms, N is 1, 2 or 3, and Q is halogen.

References Cited

UNITED STATES PATENTS 1,915,334  6/1933  Salzberg et al. _____ 260—243
2,075,359  3/1937  Salzberg et al. _____ 167—22

NICHOLAS S. RIZZO, *Primary Examiner.*

JOSE TOVAR, *Assistant Examiner.*

UNITED STATES PATENT OFFICE
CERTIFICATE OF CORRECTION

Patent No. 3,402,174                                September 17, 1968

Irwin J. Pachter

It is certified that error appears in the above identified patent and that said Letters Patent are hereby corrected as shown below:

Column 6, lines 23 to 32, the formula should appear as shown below:

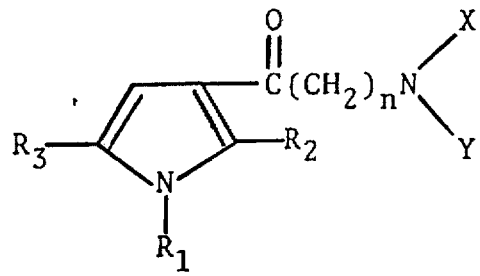

Signed and sealed this 3rd day of February 1970.

(SEAL)
Attest:

EDWARD M. FLETCHER, JR.            WILLIAM E. SCHUYLER, JR.
Attesting Officer                  Commissioner of Patents